UNITED STATES PATENT OFFICE 3,585,189
Patented June 15, 1971

3,585,189
UNSATURATED NUCLEOSIDES AND PROCESSES FOR THEIR PREPARATION
Julien P. Verheyden and John G. Moffatt, Los Altos, Calif., assignors to Syntex Corporation, Panama, Panama
No Drawing. Continuation-in-part of application Ser. No. 585,307, Oct. 10, 1966. This application June 27, 1969, Ser. No. 837,368
Int. Cl. C07d 51/52, 51/54
U.S. Cl. 260—211.5       8 Claims

ABSTRACT OF THE DISCLOSURE

5' - deoxy-β-D-erythro-pent-4'-enofuranosyl, 2',5'-dideoxy-β-D-glycero-pent-4'-enofuranosyl and 6'-deoxy-β-D-erythro-hex-5'-enofuran-2-ulosyl nucleosides are prepared by dehydrohalogenating the corresponding 5'-deoxy-5'-iodoribofuranosyl, 2',5'-dideoxy-5'-iodoribofuranosyl and 6'-deoxy-6'-iodopsicofuranosyl nucleosides with 1,5-diazobicyclo-[4-3-O]-non-5-ene. These unsaturated nucleosides are useful in producing metabolic deficiencies in biological systems. The iodo starting compounds in the purine series are prepared by reacting the corresponding 5' and 6'-hydroxy compounds with alkyltriaryloxyphosphonium iodide or aralkyltriaryloxyphosphonium iodide.

This application is a continuation-in-part of application Ser. No. 585,307 filed Oct. 10, 1966, now Pat. No. 3,472,837.

This invention relates to 6'-deoxy-D-erythro-hex-5'-enofuran-2'-ulosyl nucleosides, to a process for preparing these and unsaturated pentofuranosyl nucleosides, and to a process for preparing halogenated intermediates therefor.

In summary, the compounds of this invention are represented by the formula:

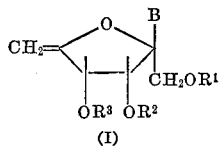

(I)

wherein:

B is a pyrimidine or purine base or a conventional hydrolyzable acyl derivative thereof but not including adenin-9-yl or its acyl derivatives; and $R^1$, $R^2$ and $R^3$ each is hydrogen or a conventional hydrolyzable acyl group.

In summary, the process of this invention for preparing unsaturated nucleosides comprises dehydrohalogenating 5'-deoxy-5'-iodo-β-D-ribofuranosyl, 2',5'-dideoxy-5'-iodo-β-D-ribofuranosyl or 6'-deoxy-6'-iodo-β-D-psicofuranosyl nucleosides with 1,5-diazabicyclo-[4-3-O]non-5-ene in an anhydrous inert organic solvent to yield the corresponding 5'-deoxy-β-D-erythro-pent-4'-enofuranosyl, 2',5'-dideoxy-β-D-glycero-pent-4'-enofuranosyl, or 6'-deoxy-β-D-erythro-hex-5'-enofuran-2'-ulosyl nucleosides.

In summary, the process for preparing 5'-deoxy-5'-iodoribofuranosyl or 2',5'-iodoribofuranosyl purines comprises iodinating the corresponding ribofuranosyl or 2'-deoxyribofuranosyl purines with a methyltriaryloxyphosphonium iodide in an anhydrous, inert organic solvent, the purine groups having all primary amino groups acylated.

The term "pyrimidine base" as used herein, refers to an unsubstituted or substituted pyrimidine or 6-azapyrimidine group wherein the point of attachment to the furanose unit is through the 1-position of the pyrimidine group.

The term "purine base" as used herein, refers to an unsubstituted or substituted purine, 7-deazapurine or 8-azapurine group wherein the point of attachment to the furanose unit is through the 9-position of the purine group. Thus, the term "pyrimidine or purine base" is inclusive of the nitrogen analogs, i.e. members of the 6-azapyrimidine, 7-deazapurine and 8-azapurine series.

More specifically, the pyrimidine and purine bases include uracil-1-yl, cytosin-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin - 1 - yl, 5-methylcytosin-1-yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 6-azauracil-1-yl, 6-azacytosin-1-yl, 6-azathymin-1-yl, hypoxanthin-9-yl, 7-deazaadenin-9-yl, 7-deazaguanin-9-yl, adenin-9-yl, 6-methylaminopurin-9-yl, 6-dimethylaminopurin-9-yl, 6-chloropurin-9-yl, 2-amino-6-chloropurin-9-yl, 6-mercaptopurin-9-yl, 6-methylmercaptopurin-9-yl, guanin-9-yl, xanthin-9-yl, 2,6-dichloropurin-9-yl, 2,6-diaminopurin-9-yl, 2,6-dimethylaminopurin-9-yl, 8-azaadenin-9-yl, thioguanin-9-yl, 2-fluoroadenin-9-yl, 6-hydroxylaminopurin-9-yl, 8-azaguanin-9-yl, and 2-amino-6-methylmercaptopurin-9-yl.

The terms "hydrolyzable esters," "hydrolyzable acyloxy groups" and "hydrolyzable acyl derivatives," as used herein, refer to those esters and acyl derivatives conventionally employed in the nucleoside and nucleotide art, preferably those derived from carboxylic acids of one to 12 carbon atoms. Typical conventional hydrolyzable acyl groups thus include acetyl, propionyl, butyryl, valeryl, isovaleryl, hexanoyl, heptanoyl, octanoyl, nonanoyl, undecanoyl, lauraloyl, benzoyl, phenylacetyl, phenylpropionyl, o-, m-, p-methylbenzoyl, β-cyclopentylpropionyl, dihydrocinnamyl, and the like.

The term "lower alkyl" means a straight or branched chain hydrocarbon group containing from one to six carbon atoms, inclusive, such as methyl, ethyl, n-propyl, i-butyl, t-butyl, optically active alkyl groups, and the like. The term "aryl" means a hydrocarbon group consisting of one or more aromatic rings and containing from six to 12 carbon atoms, inclusive, such as phenyl, benzyl, o-tolyl, m-tolyl, p-tolyl, 3,5-xylyl, pentamethylphenyl, naphthyl, and the like. The term "aralkyl" means a hydrocarbon group having a benzene ring and from seven to 12 carbon atoms such as benzyl. The term "substituted aryl" means an aryl group having one or more halo, nitro, alkoxy or dialkylamino substituents in the aromatic ring such as p - chlorobenzyl, p - bromobenzyl, 2,4,6 - trifluorophenyl, p-nitrophenyl, p-nitrobenzyl, p-anisyl, p-methoxybenzyl, p-dimethylaminophenyl, and the like.

The unsaturated compounds of this invention and the other unsaturated compounds prepared by processes of this invention exhibit anti-metabolic properties and are accordingly useful in producing metabolic deficiencies in biological systems as, for example, in the growth of various microorganisms and other undesirable systems. Moreover, these unsaturated compounds can be used as chemical intermediates in preparing analogs of naturally occuring nucleosides having similar properties.

The following representation at the 2-position

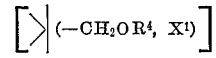

wherein $R^4$ is an acyl group, and $X^1$ is iodo or bromo means compounds having α-acyloxymethylene-β-halo and β-acyloxymethylene-α-halo configurations at the 2-position. These correspond to the halo derivatives of the respective β-D-psicofuranose and α-D-psicofuranose. When this representation is used with other groups, the corresponding orientations are intended.

The compounds of this invention are prepared by a procedure which can be illustrated as follows:

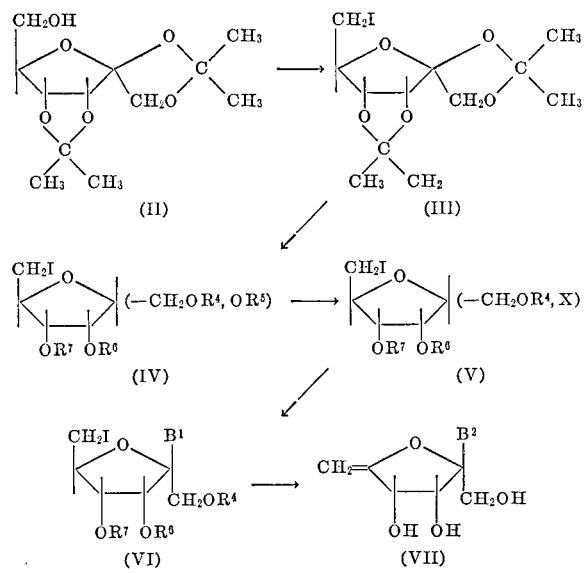

In the above procedure, $R^4$, $R^5$, $R^6$ and $R^7$ each is an acyl group, preferably benzoyl or an alkyl substituted benzoyl group having up to 10 carbons;

X is chloro or bromo;

$B^1$ represents uracil-1-yl, $N^4$-acetylcytosin-1-yl, 5-bromouracil - 1 - yl, $N^4$ - acetyl-5-bromocytosin-1-yl, 5-chlorouracil-1-yl, $N^4$-acetyl-5-chlorocytosin-1-yl, 5-iodouracil-1 - yl, $N^4$ - acetyl-5-iodocytosin-1-yl, 5-fluorouracil-1-yl, $N^4$ - acetyl - 5-fluorocytosin-1-yl, thymin-1-yl, 5-methylcytosin - 1- yl, 5-trifluoromethyluracil-1-yl, $N^4$-acetyl-5-trifluoromethylcytosin-1-yl, 5-hydroxyuracil-1-yl, 6-azauracil - 1- yl, $N^4$-acetyl-6-azocytosin-1-yl, 6-azathymin-1-yl, hypoxanthin - 9 - yl, $N^6$-benzoyl-7-deazaadenin-9-yl, $N^2$ - acetyl - 7-deazaguanin-9-yl, $N^6$-benzoyladenin-9-yl, 6-chloropurin-9-yl, 2-acetamido-6-chloropurin-9-yl, $N^2$-acetylguanin-9-yl, xanthin-9-yl, 2,6-dichloropurin-9-yl, 2,6 - dibenzamidopurin-9-yl, $N^6$-benzoyl-8-azaadenin-9-yl, $N^6$-benzoyl-2-fluoroadenin-9-yl, and $N^2$-acetyl-8-azaguanin-9-yl; and $B^2$ represents uracil-1-yl, cytosin-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5-methylcytosin - 1 - yl, 5-trifluoromethyluracil-1-yl, 5-trifluoromethylcytosin-1-yl, 5-hydroxyuracil-1-yl, 6-azauracil-1-yl, 6-azacytosin-1-yl, 6-azathymin-1-yl, hypoxanthin-9-yl, 7-deazaadenin-9-yl, 7-deazaguanin-9-yl, adenin-9-yl, 6-chloropurin-9-yl, 2-amino-6-chloropurin-9-yl, guanin-9-yl, xanthin-9-yl, 2,6-dichloropurin-9-yl, 2,6-diaminopurin-9-yl, 8-azaadenin-9-yl, 2-fluoroadenin-9-yl, and 8-azaguanin-9-yl.

The 1,2,3,4-di-O-isopropylidenepsicofuranose of Formula II has been described together with a method for its preparation in J. Chem. Soc. 77, 3050 (1955). This compound has been generally concluded to have the beta configuration (as represented in Formula II) although this has not been conclusively proven. However, compounds having the alpha and the beta configuration are equally suitable starting compounds for preparing the compounds of this invention.

The compound of Formula II is treated with an alkyltriaryloxyphosphonium iodide or an aralkyltriaryloxyphosphonium iodide, preferably with a methyltriaryloxyphosphonium iodide in an anhydrous inert organic solvent such as pyridine, benzene, acetonitrile, dimethylacetamide, or dimethylformamide, at a temperature of from 10 to 80° C. for from five minutes to 24 hours to yield the 6 - deoxy-6-iodo-1,2,3,4-di-O-isopropylidenepsicofuranose of Formula III. Preferably, the reaction is conducted with methyltriphenoxyphosphonium iodide in dimethylformamide. The isopropylidene protecting groups are then cleaved with an acid such as a mineral acid in an inert solvent to yield the corresponding free hydroxy compounds. These are esterified to yield the 1,2,3,4-tetra-O-acyl-6-deoxy-6-iodopsicofuranose compounds of Formula IV. To form the O-benzoyl or substituted benzoyl esters, the free hydroxy compound is reacted with benzoyl chloride, or an alkyl, nitro, or chloro substituted benzoyl chloride (any of the o-, m-, or p-isomers) is a pyridine solution for from 15 minutes to 2 hours at about 0° C., following which the reaction mixture is maintained for from 4 to 24 hours at room temperature. The free hydroxy compound can also be esterified with a lower aliphatic hydrocarbon acyl group such as formyl, acetyl, propionyl, butyryl, valeryl, dihydrocinnanyl and the like by reacting the free hydroxy compound with the corresponding lower aliphatic hydrocarbon carboxylic acid anhydride or acid chloride in pyridine or a mixture of pyridine and dimethylformamide at about room temperature for about 4 to 24 hours. The preferred ester groups are the benzoyl or substituted benzoyl groups.

The compounds of Formula V are prepared by halogenating the esters of Formula IV in a dry, inert organic solvent solution saturated with hydrogen chloride (at about 0° C. for about 6 days) or hydrogen bromide (at about 0° C. for from 1 to 8 hours) to yield the corresponding 2-chloro or 2-bromo compounds of Formula V. The bromo compounds are preferred.

The purine compounds of Formula VI are prepared by reacting the compounds of Formula V with known mercury derivatives of purine bases prepared, for example, as described in J. Amer. Chem. Soc. 73, 1650 (1951). These mercury derivatives (sometimes described as the mercury salt of mercuric chloride salt of the bases) are usually prepared by reacting mercuric chloride and a suitably protected base in the presence of potassium or sodium hydroxide. The purine base mercury compounds (the base being suitably protected if necessary) and the compounds of Formula V can be reacted in an anhydrous alkyl substituted benzene solvent such as xylene or toluene at reflux conditions. Preferably, the reaction is carried out in a solvent such as nitromethane at a temperature of from 15° C. up to reflux temperature. The time required for completing the reaction depends upon the reaction temperature. At the lower temperatures, reaction times of from 8 hours up to several days may be required. At higher temperatures such as reflux temperatures, reaction times of from 15 minutes to 4 hours are usually sufficient. With mercury salts of some bases, the yield is improved by refluxing.

The pyrimidine compounds of Formula VI are prepared by reacting the compounds of Formula V with trimethylsilyl derivatives of pyrimidine bases in which any primary amino substituents are first protected by acylation. The trimethylsilyl derivatives are known in the art, and procedures for their preparation are described in Chem. Pharm. Bull. Japan 12, 352 (1964). Among the specific compounds disclosed in this paper are $N^4$-acetyl-bis(trimethylsilyl)-cytosine, bis(trimethylsilyl)uracil and bis(trimethylsilyl)thymine. The compounds of Formula V are reacted with the trimethylsilyl derivatives of pyrimidine bases in an inert organic solvent such as toluene, xylene and the like or preferably nitromethane at temperatures of from 20 to 150° C. for from 5 minutes to 24 hours to yield the pyrimidine nucleosides of Formula VI.

The compounds of Formula VI are dehydrohalogenated to yield the 6-deoxy-β-D-erythro-hex-5-enofuran-2-ulosyl nucleosides of Formula VII. The preferred procedure for effecting dehydrohalogenation comprises treating the compounds of Formula VI with 1,5-diazobicyclo[4-3-O]-non-5-ene in an anhydrous inert organic solvent such as dimethylformamide, benzene, toluene, dimethylacetamide or acetonitrile (preferably dimethylformamide) at a temperature of 10 to 80° C. for from 5 minutes to 24 hours. Partial deacylation often occurs in this reaction. Alternately, the compounds of Formula VI can be treated with silver fluoride or a combination of silver carbonate and sodium fluoride under anhydrous conditions in a suitable inert organic solvent such as pyridine, 2,6-lutidine, collidine, 2-picoline and the like (preferably pyridine). This reaction is carried out at a temperature of from 10 to 40° C., for from 24 to 96 hours. The preferred reagent is 1,5-diazobicyclo[4-3-O]-non-5-ene because the reaction times with this reagent are far less than with the silver compounds, and for preparing most of the compounds of Formula VI, higher yields are obtained.

The dehydrohalogenated compounds are then completely deacylated by treatment with a base such as aqueous ammonium hydroxide in methanol or methanolic ammonia at from 10 to 60° C. for from 4 to 24 hours. During this treatment, the acyl protecting groups on the pyrimidine and purine base moieties are also removed. To remove some N-acyl groups from purine rings, the longer reaction times are required.

The compounds of Formula VII can be acylated as previously described to prepare the corresponding esters of Formula I.

Compounds of Formula VIII, below, can be prepared from certain compounds of Formula VII.

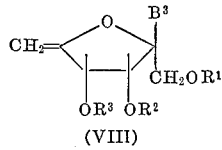

(VIII)

In the above formula, $R^1$, $R^2$, and $R^3$ are as previously defined, and $B^3$ represents a 6 - methylaminopurin-9-yl, 6-dimethylaminopurin - 9 - yl, 2,6-di(methylamino)purin-9-yl, 6-hydroxyaminopurin - 9 - yl, 6 - mercaptopurin-9-yl, 6-methylmercaptopurin - 9 - yl, thioguanin - 9-yl, or 2-amino - 6 - methylmercaptopurin-9-yl, 5-aminouracil-1 - yl, 5 - aminocytosin-1-yl, 5-methylaminouracil-1-yl, or 5-methylaminocytosin-1-yl group.

The 6 - methylaminopurine, 2,6-di(methylamino)purin and 6-dimethylaminopurine compounds of Formula VIII are prepared by reacting 6-chloro-9-(6-deoxy-β-D-erythro-hex-5-enofuran-2-ulosyl)-purine with anhydrous methylamine or dimethylamino respectively, in a lower aliphatic alcohol such as methanol, ethanol, propanol, isopropanol, t-butanol and the like (preferably ethanol) at from 80 to 120° C. (under pressure if necessary). Reaction with dimethylamine in water can be effected at room temperature.

The 5-aminouracil, 5-aminocytosine, 5-methylaminouracil and 5-methylaminocytosine compounds of Formula VIII are prepared by reacting the corresponding 5-bromouracil or 5-bromocytosine with anhydrous ammonia or methylamine, respectively, at 60 to 100° C. for 4 to 24 hours under pressure.

The 6-hydroxyaminopurine compounds of Formula VIII are prepared by reacting the corresponding 6-chloropurine compounds with hydroxylamine in ethanol at about 50° C. for 2 to 12 hours.

To prepare the 9-(6-deoxy-β-D-erythro-hex-5-enofuran-2 - ulosyl) - 6-mercaptopurine, 6-chloro-9-(6-deoxy-β-D-erythro-hex - 5-enofuran-2-ulosyl)-purine is reacted with thiourea in an absolute lower aliphatic alcohol such as ethanol, isopropanol, propanol and the like (preferably propanol) at reflux for about 2 hours while the pH is maintained at about 6 by adding sodium hydroxide.

To prepare the coresponding 6-methylmercaptopurine compounds, the 6-mercaptopurine compounds are reacted with methyl iodide in aqueous sodium hydroxide at room temperature for about 4 hours. Repeating these procedures with 2 - acetylamido - 6 - chloro - 9 - (6-deoxy-β-D-erythro-hex - 5 - enofuran - 2 - ulosyl)-purine yields the corresponding 9 - (6-deoxy-β-D-erythro-hex-5-enofuran-2-ulosyl)-thioguanine and 2-amino-9-(6-deoxy-β-D-erythrohex - 5 - enofuran - 2 - ulosyl)-6-methylmercaptopurine of Formula VIII.

The novel dehydrohalogenating process of this invention is also suitable for dehydrohalogenating 5'-deoxy-5'-iodoribofuranosides and 2',5' - dideoxy - 5' - iodoribofuranosides as represented by the following:

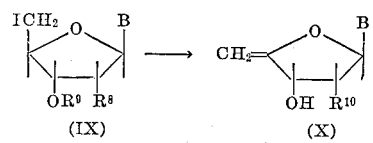

In the above formulas,

B is as previously defined;

$R^8$ is hydrogen or a conventional hydrolyzable acyloxy group;

$R^9$ is a conventional hydrolyzable acyl group; and $R^{10}$ is hydrogen or a hydroxy group.

The compounds of Formula IX are dehydrohalogenated to form the 5'-deoxy-β-D-erythro-pent-4'-enofuranosyl nucleosides and 2',5'-dideoxy-β-D-glycero-pent-4'-enofuranosyl nucleosides of Formula X by the procedure described above for preparing the compounds of Formula VII.

The compounds of Formula IX are known in the art or can be prepared as described in U.S. application Ser. No. 585,307 filed Oct. 10, 1966. A 5'-hydroxy starting material, in which other hydroxy groups are protected through esterification, is converted to the corresponding 5'-tosylate. This tosylate is treated with sodium iodide, the tosylate group being displaced by an iodo group. In the case of some derivatives, notably those having a purine base, the displacement reaction is best conducted in acetic anhydride. Alternatively, iodination of the O,N-acylated nucleoside is achieved through the action of an alkyltriaryloxyphosphonium iodide or an aralkyltriaryloxyphosphonium iodide such as methyl triaryloxyphosphonium iodide.

An improved process of this invention for iodination of purine derivatives can be represented as follows:

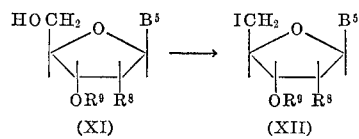

In the above formulas, $R^8$ and $R^9$ are as previously defined and $B^5$ is a purine base having all primary amino groups acylated.

In previous attempts to iodinate purine nucleosides with alkyltriaryloxyphosphonium iodides or aralkyltriaryloxyphosphonium iodides, $N^3$,5'-cyclization occurred. It has been found that if all primary amino groups present in the purine base moiety are acylate (preferably with benzoyl or substituted benzoyl groups), this cyclization does not occur. Instead, the desired iodination is obtained.

In this procedure, the 5'-hydroxy compounds of Formula XI are reacted with a (lower alkyl)triaryloxyphosphonium iodide or aralkyltriaryloxyphosphonium iodide, preferably methyltriaryloxyphosphonium iodide in an anhydrous, inert organic solvent such as dimethylformamide, dimethylacetamide, acetonitrile, pyridine, benzene, and the like (preferably dimethylformamide) for from 5 minutes to 24 hours at a temperature of from 10 to 80° C. (preferably at about room temperature) to yield the compounds of Formula XII. Preferably, only one equivalent of the reagent and the shorter reaction times are used.

PREPARATION A

Bis(trimethylsilyl)pyrimidines $N^4$-acetylcytosine (3.0 g.) is suspended in 50 ml. of dry benzene containing 6.0 g. of trimethylchlorosilane and 4.5 g. of triethylamine. The mixture is stirred for 48 hours at 20° C., and the triethylamine hydrochloride is filtered in a dry box and rinsed with dry benzene. The filtrate is evaporated to dryness and thoroughly dried. The residue is distilled under high vacuum ($10^{-2}$ mm. Hg, 60° C.) yielding $N^4$-acetylbis-(trimethylsilyl)-cytosine.

Repeating the above procedure with other pyrimidine bases having primary amino groups acylated yields the corresponding bis-(trimethylsilyl)-pyrimidines.

PREPARATION B

Mercury salt of $N^6$-benzoyl-2-fluoroadenosine

A mixture of 10 g. of 2-fluoroadenine [J.A.C.S. 82, 463 (1960)] and 40 g. of benzoic anhydride in an open flask submerged in an oil bath at 140° C. is stirred for 2 hours. The mixture is cooled to 80° C., and ethanol is added. The precipitate which forms is filtered and purified by chromatography. The resulting $N^6$-benzoyl-2-fluoroadenine is then added to a mixture of ethanol and water (1:1), and one equivalent of sodium hydroxide is slowly added. To this is added dropwise one equivalent of mercuric chloride dissolved in a minimal amount of hot ethanol. A precipitate is formed, more water is added, the suspension is cooled and filtered. The solids are washed and dried to yield the mercury salt of $N^6$-benzoyl-2-fluoroadenosine.

Repeating the above procedure with other purine bases having the primary amino groups acylated yields the corresponding mercury salts.

EXAMPLE 1

6-deoxy-6-iodo-1,2,3,4-di-O-isopropylidenepsicofuranose 1,2:3,4-di-O-isopropylidenepsicofuranose (10 g., 40 mM.) is dissolved in 50 ml. of dry dimethylformamide, and methyltriphenoxyphosphonium iodide (25 g., 53 mM.) is added. After 10 minutes at 20° C., the excess reagent is decomposed with methanol, and the solvents are evaporated under vacuum. The syrupy residue is dissolved in chloroform and washed with aqueous solutions of sodium hydroxide, sodium thiosulfate and finally with water. The chloroform layer is dried over magnesium sulfate, evaporated to dryness, and the residue is chromatographed on a column of 200 g. of silica gel. The iodo derivative is eluted with chloroform. Evaporation of the fractions leaves a colorless syrup which is distilled under vacuum ($10^{-3}$ mm. Hg, 80° C.). The distillate crystallizes spontaneously giving 6-deoxy-6-iodo-1,2,3,4-di-O-isopropylidenepsicofuranose.

EXAMPLE 2

1,2,3,4-tetra-O-benzoyl-6-deoxy-6-iodopsicofuranose

6 - deoxy - 6 - iodo - 1,2,3,4 - di-O-isopropylidenepsicofuranose (7.36 g., 20 mM.) is heated in 150 ml. of a mixture of dioxane and 2 N $H_2SO_4$ (1:1) at 100° C. for one hour. After cooling by dilution with 100 ml. of water, the solution is neutralized with $Ba_2CO_3$. The precipitate is filtered and washed with water, and the filtrate is extracted with chloroform. The aqueous layer is evaporated to dryness, and the residue is carefully dried in order to remove all traces of water. The resulting syrup is dissolved in 20 ml. of pyridine, and 10 ml. of benzoyl chloride is added at 0° C. The reaction is kept at 20° C. overnight, and the excess reagent is destroyed by adding methanol. The solvents are evaporated under vacuum, and the residue is partitioned between water and chloroform. The organic layer is dried over magnesium sulfate and evaporated to dryness. The residue is chromatographed over silica gel. Elution with benzene containing 1 percent chloroform yields 1,2,3,4 - tetra - O - benzoyl - 6 - deoxy-6-iodopsicofuranose.

EXAMPLE 3

$N^6$-benzoyl-9-(1,3,4-tri-O-benzoyl-6-deoxy-6-iodo-β-D-psicofuranosyl)-adenine 1,2,3,4 - tetra - O - benzoyl - 6 - deoxy - 6 - iodopsicofuranose (2.5 g. 2.5 mM.) is dissolved in 25 ml. of chloroform which is then saturated with dry HBr at 0° C. After 3 hours at 0° C., the solution is evaporated to dryness in vacuum. The residue is dissolved in dry nitromethane and stirred with $N^6$-benzoylchloromercuriadenine (1.42 g., 3 mM.) for 48 hours at 20° C. The solvent is evaporated to dryness, and the residue is dissolved in ethyl acetate. The solution is filtered, and the filtrate is washed with an aqueous solution of sodium iodide and with water. The organic layer is dried over magnesium sulfate and evaporated to dryness. The resulting syrup is chromatographed over five preparative thin layer plates (1 m. x 20 cm. x 1.3 mm.) of silica HF. The main UV-absorbing band is eluted from the silica gel with acetone, and evaporated to yield $N^6$-benzoyl - 9 - (1,3,4 - tri - O - benzoyl-6-deoxy-6-iodo-β-D-psicofuranosyl)-adenine.

EXAMPLE 4

9-(1,3,4-tri-O-benzoyl-6-deoxy-6-iodo-β-psicofuranosyl)-purines

Repeating the procedure of Example 3 but replacing $N^6$ - benzoylchloromercuriadenine with the mercury salts of $N^2$ - acetylguanine, hypoxanthine, 6-chloropurine, 2,6-dichloropurine, 2,6-dibenzamidopurine, $N^2$ - acetyl - 6 - chloropurine, $N^6$ - benzoyl - 8 - azaadenine, $N^2$ - acetyl-8 - azaguanine, and $N^6$ - benzoyl - 2 - fluoroadenine yields the corresponding:

$N^2$-acetyl-9-(1,3,4-tri-O-benzoyl-6-deoxy-6-iodo-β-D-psicofuranosyl)-guanine,
9-(1,3,4-tri-O-benzoyl-6-deoxy-6-iodo-β-D-psicofuranosyl)-hypoxanthine,
9-(1,3,4-tri-O-benzoyl-6-deoxy-6-iodo-β-D-psicofuranosyl)-6-chloropurine,
9-(1,3,4-tri-O-benzoyl-6-deoxy-6-iodo-β-D-psicofuranosyl)-2,6-dichloropurine,
2,6-dibenzamido-9-(1,3,4-tri-O-benzoyl-6-deoxy-6-iodo-β-D-psicofuranosyl)-purine,
$N^2$-acetyl-9-(1,3,4-tri-O-benzoyl-6-deoxy-6-iodo-β-D-psicofuranosyl)-6-chloropurine,
9-(1,3,4-tri-O-benzoyl-6-deoxy-6-iodo-β-D-psicofuranosyl)-$N^6$-benzoyl-8-azaadenine,
$N^2$-acetyl-9-(1,3,4-tri-O-benzoyl-6-deoxy-6-iodo-β-D-psicofuranosyl)-8-azaguanine, and
9-(1,3,4-tri-O-benzoyl-6-deoxy-6-iodo-β-D-psicofuranosyl)-$N^6$-benzoyl-2-fluoroadenine.

EXAMPLE 5

9-(6-deoxy-β-D-erythro-hex-5-enofuran-2-ulosyl)-adenine $N^6$ - benzoyl - 9 - (1',3',4' - tri- O - benzoyl - 6 - deoxy-6-iodo-β-D-psicofuranosyl)-adenine (0.82 g., 1 mM.), is dissolved in dry benzene, and 1.5 equivalents of 1,5-diazobicyclo - [4-3-0] - non - 5 - ene in benzene is added. After 45 minutes of reflux, the reaction is cooled to 20° C. and decanted from a brown gum. The supernatant is evaporated to dryness leaving a residue which was dissolved in 20 ml. of methanol. To this solution, 2 ml. of concentrated ammonia is added, and the hydrolysis is continued for 24 hours at 20° C. The solvents are evaporated, and the resulting syrup is chromatographed on an ion-exchange resin (Dowex 2 OH⊖). The nucleoside is eluted with methanol::water (1:1). The combined fractions are evaporated to dryness giving 9-(6-deoxy-β-D-erythro-hex-5-enofuran-2-ulosyl)-adenine.

EXAMPLE 6

9-(6-deoxy-β-D-erythro-hex-5-enofuran-2-ulosyl)-purines

Repeating the procedure of Example 5 with the products of Example 4 yields the corresponding:

9-(6-deoxy-β-D-erythro-hex-5-enofuran-2-ulsoyl)-guanine,
9-(6-deoxy-β-D-erythro-hex-5-enofuran-2-ulosyl)-hypoxanthine,
6-chloro-9-(6-deoxy-β-D-erythro-hex-5-enofuran-2-ulosyl)-purine,
2,6-dichloro-9-(6-deoxy-β-D-erythro-hex-5-enofuran-2-ulosyl)-purine,
2,6-diamino-9-(6-deoxy-β-D-erythro-hex-5-enofuran-2-ulosyl)-purine,
2-amino-6-chloro-9-(6-deoxy-β-D-erythro-hex-5-enofuran-2-ulosyl)-purine,
9-(6-deoxy-β-D-erythro-hex-5-enofuran-2-ulosyl)-β-azaadenine,
9-(6-deoxy-β-D-erythro-hex-5-enofuran-2-ulosyl)-8-azaguanine, and
9-(6-deoxy-β-D-erythro-hex-5-enofuran-2-ulosyl)-2-fluoroadenine.

EXAMPLE 7

$N^4$-acetyl-1-(1,3,4-tri-O-benzoyl-6-deoxy-6-iodo-β-D-psicofuranosyl)-cytosine 1,2,3,4-tetra-O-benzoylpsicofuranose (320 mg., 0.5 mM.) is dissolved in chloroform, and the solution is saturated at 0° C. with dry HBr. After 3 hours at 0° C., the solution is evaporated to dryness in vacuum. The residue is dissolved in 20 ml. of nitromethane, and $N^4$-acetyl-bis-trimethylsilylcytosine (300 mg., 0.5 mM.) and mercuric bromide (180 mg., 0.5 mM.) are added. The suspension is stirred at 20° C. for 48 hours. The reaction mixture is evaporated to dryness, and the residue is dissolved in chloroform. The solution is washed with aqueous solutions of sodium bicarbonate, of sodium iodide and of sodium thiosulfate and finally with water. The chloroform layer is dried over magnesium sulfate and evaporated to dryness. The residue is purified by preparative thin layer chromatography (1 m. x 20 cm. x 1.3 mm.). The main UV band is eluted from the silica gel with acetone. Evaporation of the solvent gives $N^4$-acetyl-1-(1,3,4-tri-O-benzoyl-6-deoxy-6-iodo-β-D-psicofuranosyl)-cytosine.

EXAMPLE 8

1-(1,3,4-tri-O-benzoyl-6-deoxy-6-iodo-β-D-psicofuranosyl)-pyrimidines

Repeating the procedure of Example 7 but replacing $N^4$-acetyl-bis-trimethylsilylcytosine with bis-trimethylsilyluracil,
bis-trimethylsilylthymine,
5-fluoro-bis-trimethylsilyluracil,
5-chloro-bis-trimethylsilyluracil,
5-trifluoromethyl-bis-trimethylsilyluracil,
bis-trimethylsilyl-6-azauracil,
bis-trimethylsilyl-6-azathymine,
$N^4$-acetyl-5-chloro-bis-trimethylsilylcytosine,
$N^4$-acetyl-5-fluoro-bis-trimethylsilylcytosine,
$N^4$-acetyl-5-trifluoromethyl-bis-trimethylsilylcytosine,
5-bromo-bis-trimethylsilyluracil,
$N^4$-acetyl-5-bromo-bis-trimethylsilylcytosine,
5-iodo-bis-trimethylsilyluracil, and
$N^4$-acetyl-5-iodo-bis-trimethylsilylcytosine yields the corresponding 1-(1,3,4-tri-O-benzoyl-6-deoxy-6-iodo-β-D-psicofuranosyl)-uracil,
1-(1,3,4-tri-O-benzoyl-6-deoxy-6-iodo-β-D-psicofuranosyl)-thymine,
1-(1,3,4-tri-O-benzoyl-6-deoxy-6-iodo-β-D-psicofuranosyl)-5-fluorouracil,
1-(1,3,4-tri-O-benzoyl-6-deoxy-6-iodo-β-D-psicofuranosyl)-5-chlorouracil,
1-(1,3,4-tri-O-benzoyl-6-deoxy-6-iodo-β-D-psicofuranosyl)-5-trifluoromethyluracil,
1-(1,3,4-tri-O-benzoyl-6-deoxy-6-iodo-β-D-psicofuranosyl)-6-azauracil,
1-(1,3,4,-tri-O-benzoyl-6-deoxy-6-iodo-β-D-psicofuranosyl)-6-azathymine,
N-acetyl-1-(1,3,4-tri-O-benzoyl-6-deoxy-6-iodo-β-D-psicofuranosyl)-5-chlorocytosine,
N-acetyl-1-(1,3,4-tri-O-benzoyl-6-deoxy-6-iodo-β-D-psicofuranosyl)-5-fluorocytosine,
N-acetyl-1-(1,3,4-tri-O-benzoyl-6-deoxy-6-iodo-β-D-psicofuranosyl)-5-trifluoromethylcytosine,
1-(1,3,4-tri-O-benzoyl-6-deoxy-6-iodo-β-D-psicofuranosyl)-5-bromouracil,
N-acetyl-1-(1,3,4-tri-O-benzoyl-6-deoxy-6-iodo-β-D-psicofuranosyl)-5-bromocytosine,
1-(1,3,4-tri-O-benzoyl-6-deoxy-6-iodo-β-D-psicofuranosyl)-5-iodouracil, and
N-acetyl-1-(1,3,4-tri-O-benzoyl-6-deoxy-6-iodo-β-D-psicofuranosyl)-5-iodocyosine.

EXAMPLE 9

1-(6-deoxy-D-erythro-hex-5-enofuran-2-ulosyl)-cytosine $N^4$-acetyl-1-(1,3,4-tri-O-benzoyl-6-deoxy-6-iodo-β-D-psicofuranosyl)-cytosine (0.74 g., 1 mM.) is dissolved in 5 ml. of dry dimethylformamide, and 1,5-diazobicyclo-[4-3-O]-non-5-ene (0.23 g., 2 mM.) is added. The solution is kept for 90 minutes at 20° C.; then a mixture of methanol (10 ml.) and ammonia is added, and the reaction mixture is kept overnight at 20° C. The mixture is evaporated to dryness, and the residue is chromatographed on an ion-exchange resin (Dowex 2 OH⊖). The product is eluted using a linear gradient from 0 percent up to 4 percent of methanol in water. The α-anomer of 1-(6-deoxy-D-erythro-hex-5-enofuran-2-ulosyl)-cytosine is eluted first. The main fraction consists of the β-anomer and is crystallized from methanol.

EXAMPLE 10

1-(6-deoxy-D-erythro-hex-5-enofuran-2-ulosyl)-pyrimidines

Repeating the procedure of Example 9 with the products of Example 8 yields the corresponding alpha and beta:

1-(6-deoxy-D-erythro-hex-5-enofuran-2-ulosyl)-uracil,
1-(6-deoxy-D-erythro-hex-5-enofuran-2-ulosyl)-thymine,
1-(6-deoxy-D-erythro-hex-5-enofuran-2-ulosyl)-5-fluorouracil,
5-chloro-1-(6-deoxy-D-erythro-hex-5-enofuran-2-ulosyl)-uracil,
1-(6-deoxy-D-erythro-hex-5-enofuran-2-ulosyl)-5-trifluoromethyluracil,
1-(6-deoxy-D-erythro-hex-5-enofuran-2-ulosyl)-6-azauracil,
1-(6-deoxy-D-erythro-hex-5-enofuran-2-ulosyl)-6-azathymine,
5-chloro-1-(6-deoxy-D-erythro-hex-5-enofuran-2-ulosyl)-cytosine,
1-(6-deoxy-D-erythro-hex-5-enofuran-2-ulosyl)-5-fluorocytosine,
1-(6-deoxy-D-erythro-hex-5-enofuran-2-ulosyl)-5-trifluoromethylcytosine,
5-chloro-1-(6-deoxy-D-erythro-hex-5-enofuran-2-ulosyl)-uracil,
5-chloro-1-(6-deoxy-D-erythro-hex-5-enofuran-2-ulosyl)-cytosine,
1-(6-deoxy-D-erythro-hex-5-enofuran-2-ulosyl)-5-iodouracil, and
1-(6-deoxy-D-erythro-hex-5-enofuran-2-ulosyl)-5-iodocytosine.

EXAMPLE 11

9-(6-deoxy-β-D-erythro-hex-5-enofuran-2-ulosyl)-6-mercaptopurine and 6-thioguanine 6 - chloro - 9 - (6-deoxy-β-D-erythro-hex-5-enofuran-2-ulosyl)-purine (1 g.) in propanol (30 ml.) containing thiourea (1.2 equivalents) is refluxed for two hours while a pH of about 6 is maintained by adding a dilute sodium hydroxide in propanol solution. The reaction mixture is evaporated to dryness, and the residue is purified by chromatography on silicic acid to yield 9-(6-deoxy-β-D-erythro-hex-5-enofuran-2-ulosyl)-6-mercaptopurine.

Repeating the above procedure with 2-acetamido-6-chloro - (6 - deoxy-β-D-erythro-hex-5-enofuran-2-ulosyl)-purine followed by treatment under nitrogen with concentrated ammonium hydroxide prior to chromatography (to remove the $N^2$-acetyl group) yields the corresponding 9-(6 - deoxy - β - D-erythro-hex-5-enofuran-2-ulosyl)-thioguanine.

EXAMPLE 12

9 - (6 - deoxy - β - D - erythro-hex-5-enofuran-2-ulosyl)-6 - methylmercaptopurine and 2 - amino - 6 - methylmercaptopurine 9 - (6 - deoxy - β-D-erythro-hex-5-enofuran-2-ulosyl)-purine (0.30 g. mole) in 310 ml. of 1 N sodium hydroxide is diluted with 450 ml. of water and vigorously stirred while methyl iodide (0.32 g. moles) is added dropwise. The solution is stirred at 20° C. for four hours, chilled, neutralized carefully to a pH of 7.0 with glacial acetic acid, and evaporated to dryness. The residue is dissolved in hot ethanol and filtered. The filtrate is purified by chromatography to yield 9-(6-deoxy-β-D-erythro-hex-5-enofuran-2-ulosyl)-6-methylmercaptopurine.

Repeating the above procedure with 9-(6-deoxy-β-D-erythro-hex-5-enofuran-2-ulosyl)-thioguanine yields the corresponding 2 - amino - 9-(6-deoxy-β-D-erythro-hex-5-enofuran-2-ulosyl)-6-methylmercaptopurine.

EXAMPLE 13

9 - (6 - deoxy-β-D-erythro-hex-5-enofuran-2-ulosyl)-6-methylaminopurine and 6-dimethylaminopurine 6 - chloro - 9 - (6-deoxy-β-D-erythro-hex-5-enofuran-2-ulosyl)-purine (1 g.) is dissolved in ethanol (50 ml.), and to this mixture sodium bicarbonate (1 g.) and anhydrous methylamine (1 g.) is added. The reaction mixture is heated at reflux temperature for 1 hour. The sodium bicarbonate is removed by filtration, and the filtrate is evaporated to dryness and purified by chromatography on a column of silicic acid followed by crystallization to yield 9 - (6 - deoxy - β - D - erythro - hex - 5 - enofuran-2-ulosyl)-6-methylaminopurine.

Repeating the above procedure with anhydrous dimethylamine yields the corresponding 9-(6-deoxy-β-D-erythro-hex-5-enfouran-2-ulosyl)-6-dimethylaminopurine.

EXAMPLE 14

9 - (6-deoxy-β-D-erythro-hex-5-enofuran-2-ulosyl)-6-hydroxyaminopurine

6 - chloro - 9 - (6-deoxy-β-D-erythro-hex-5-enofuran-2-ulosyl)-purine (300 mg.) is dissolved in 10 ml. of a 0.5 M ethanolic solution of hydroxylamine (prepared as in J. Amer. Chem. Soc. 80, 3932) and kept at 50° C. for six hours. The mixture is then evaporated and purified by chromatography on silicic acid to yield 9-(6-deoxy-β-D-erythro-hex-5-enofuran-2-ulosyl)-6-hydroxyaminopurine.

EXAMPLE 15

5 - amino - 1 - (6 - deoxy - β - D - erythro - hex - 5 - enofuran - 2 - ulosyl) - uracil and 5 - amino - 1 - (6-deoxy - β - D - erythro - hex - 5 - enofuran - 2 - ulosyl)-cytosine 5 - bromo - 1 - (6 - deoxy - β - D - erythro - hex - 5-enofuran - 2 - ulosyl) - uracil (0.5 g.) is dissolved in anhydrous ammonia and heated in a stainless steel bomb at 80° C. for 18 hours. After evaporating the solvent, the residue is purified by chromatography on a column of silicic acid followed by crystallization to yield 5-amino-1-(6-deoxy-β-D-erythro-hex-5-enofuran-2-ulosyl)-uracil.

Repeating this procedure with 5-bromo-1-(6-deoxy-β-D-erythro-hex-5-enofuran-2-ulosyl)-cytosine yields the corresponding 5 - amino - 1 - (6 - deoxy-β-D-erythro-hex-5-enofuran-2-ulosyl)-cytosine.

EXAMPLE 16

1-(6-deoxy-β-D-erythro-hex-5-enofuran-2-ulosyl)-5-methylamino-uracil and 5-methylaminocytosine Repeating the procedure of Example 15 but replacing anhydrous ammonia with anhydrous methylamine yields the corresponding 1 - (6 - deoxy-β-D-erythro-hex-5-enofuran-2-ulosyl)-5-methylamino-uracil and 1-(6-deoxy-β-D - erythro - hex - 5 - enofuran-2-ulosyl)-5-methylaminocytosine.

EXAMPLE 17

$N^1,N^6,2',3'$-O-tetrabenzoyl-5'-deoxy-5'-iodoadenosine $N^1,N^6,2',3'$-O-tetrabenzoyladenosine (3.41 g., 5 mM.) is dissolved in 20 ml. of dimethylformamide, and methyltriphenoxyphosphonium iodide (3.35 g., 7.7 mM.) is added. After 10 min., the excess reagent is decomposed by addition of methanol, and the solvents are evaporated in vacuum. The brown residue is dissolved in chloroform, and the solution is washed with an aqueous solution of sodium bicarbonate, sodium thiosulfate and finally with water. The chloroform layer is dried over magnesium sulfate and evaporated to dryness. The residue crystallizes spontaneously and is recrystallized from ethanol; after filtration $N^1,N^6,2',3'$ - O - tetrabenzoyl-5'-deoxy-5'-iodoadenosine is obtained.

EXAMPLE 18

Preparation of 9 - (5 - deoxy-β-D-erythro-pent - 4 - enofuranosyl)-adenine using silver fluoride in pyridine $N^1,N^6,2',3'$ - O - tetrabenzoyl - 5' - deoxy - 5' - iodoadenosine (0.80 g., 1 mM.) was dissolved in 10 ml. of dry pyridine and silver fluoride (0.13 g., 1 mM.) was added. The suspension was stirred for 90 minutes in the dark at 20° C., then diluted with dry ethyl acetate and filtered. The filtrate was washed with an aqueous solution of sodium bicarbonate and with water. The organic layer was dried with magnesium sulfate and evaporated to dryness. The syrupy residue was dissolved in 2 ml. of methanol and 2 ml. of concentrated ammonia. After 24 hours at 20° C., the reaction mixture was evaporated to dryness. The residue was chromatographed on a column of ion-exchange resin (Dowex 2 OH⊖), and the product was eluted with a mixture of methanol and water (45:55). The fractions containing the desired product were pooled and evaporated to dryness. The residue was crystallized from ethanol to yield 36 mg. (14.5 percent yield) of 9-(5-deoxy-β-D-erythropent-4-enofuranosyl)-adenine.

EXAMPLE 19

Preparation of 9 - (5 - deoxy - β - D - erythro - pent - 4-enofuranosyl)-adenine using silver carbonate and sodium fluoride $N^1,N^6,2',3'$ - O - tetrabenzoyl - 5' - deoxy - 5' - iodoadenosine (0.80 g., 1 mM.) was dissolved in 20 ml. of dry pyridine and stirred with silver carbonate (1.4 g.) and sodium fluoride (0.2 g., 5 mM.) at 20° C. in the dark for 48 hours. The reaction mixture was worked up in the same manner as described in Example 13 to yield 39 mg. (15.5 percent yield) of 9-(5-deoxy-β-D-erythropent-4-enofuranosyl)-adenine.

EXAMPLE 20

Preparation of 9 - (5 - deoxy - β - D - erythro - pent - 4-enofuranosyl)-adenine using 1,5 - diazobicyclo[4-3-0]-non-5-ene $N^1,N^6,2',3'$ - O - tetrabenzoyl - 5' - deoxy - 5' - iodoadenosine (0.80 g., 1 mM.) was dissolved in 50 ml. of dry benzene, and 1,5-diazobicyclo[4-3-O]-non-5-ene (230 mg., 2 mM.) was added. After 45 minutes of reflux, the reaction was cooled and decanted from an insoluble dark gum. The benzene solution was evaporated to dryness, and the residue was hydrolyzed with methanol and concentrated ammonia and purified as described in Example 13 to yield 179 mg. (72 percent yield) of 9-(5-deoxy-β-D-erythro-pent-4-enofuranosyl)-adenine.

We claim:

1. A process for preparing an unsaturated nucleoside comprising dehydrohalogenating a 5'-deoxy-5'-iodoribofuranosyl, 2',5'-dideoxy-5'-iodoribofuranosyl or 6'-deoxy-6'-iodopsicofuranosyl nucleoside with 1,5-diazobicyclo[4-3-O]-non-5-ene in an anhydrous inert organic solvent to yield the corresponding 5-deoxy-β-D-erythro-pent-4-enofuranosyl, 2,5-dideoxy - β - D - glycero-pent-4-enofuranosyl, or 6 - deoxy - β - D - erythro-hex-5-enofuran-2-ulosyl nucleoside.

2. A process for preparing a 9 - (5' - deoxy -5' - indoribofuranosyl)purine or a 9-(2',5' - dideoxy-5'-iodoribofuranosyl)purine comprising iodinating the corresponding ribofuranosyl or 2' - deoxy - ribofuranosyl purine with a (lower alkyl)triaryloxyphosphonium iodide or an aralkyloxytriaryloxyphosphonium iodide in an aprotic solvent, the purine base having all primary amino groups acylated.

3. A compound selected from the group of compounds represented by the formula:

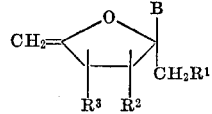

wherein

B is a pyrimidine or purine base selected from the group consisting of uracil-1-yl, cytosin-1-yl, 5-bromouracil-1-yl, 5-bromocytosin-1-yl, 5-chlorouracil-1-yl, 5 - chlorocytosin - 1 - yl, 5 - iodouracil - 1 - yl, 5 - iodocytosin-1-yl, 5 - fluorouracil-1-yl, 5-fluorocytosin - 1 yl, thyrmin-1-yl, 5-methylcytosin - 1 - yl, 5 - trifluoromethyluracil - 1 - yl, 5-trifluoromethylcytosin-1-yl, 5 - aminouracil - 1 -yl, 5 - aminocytosin-1-yl, 5 - methylaminouracil-1-yl, 5 - methylaminocytosin-1-yl, 5-hydroxyuracil-1-yl, 6-azauracil-1-yl, 6 - azacytosin - 1 - yl, 6-azathymin - 1 - yl, 7-deazaadenin-9-yl, 7-deazaguanin-9-yl- 8-azaadenin - 9 - yl, 6 - hydroxyaminopurin - 9 - yl, 8 - azaguanin - 9 - yl, and hydrolyzable acyl derivatives thereof from a carboxylic acid having from 1 to 12 carbons; and $R^1$, $R^2$ and $R^3$ each is hydroxy or a hydrolyzable ester thereof derived from a carboxylic acid having from 1 to 12 carbons.

4. A compound of claim 3 wherein B is a purine base.

5. A compound of claim 3 wherein B is a pyrimidine base.

6. A compound of claim 5 wherein B is a 6-azacytosine group.

7. A compound of claim 5 wherein B is a 6-azauracil group.

8. The process of claim 1 wherein the nucleoside has a purin-9-yl or pyrimidin-1-yl base group.

References Cited

UNITED STATES PATENTS

| | | | |
|---|---|---|---|
| 3,126,372 | 3/1964 | Bannister | 260—211.5 |
| 3,180,859 | 4/1965 | Hoeksema | 260—211.5 |
| 3,207,750 | 9/1965 | DeBoer et al. | 260—211.5 |

LEWIS GOTTS, Primary Examiner

J. R. BROWN, Assistant Examiner

U.S. Cl. X.R.

260—999